(12) United States Patent
Ueda

(10) Patent No.: US 7,660,604 B2
(45) Date of Patent: Feb. 9, 2010

(54) MOBILE TERMINAL

(75) Inventor: Takeyuki Ueda, Kawasaki (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 1519 days.

(21) Appl. No.: 10/647,328

(22) Filed: Aug. 26, 2003

(65) Prior Publication Data

US 2004/0056897 A1 Mar. 25, 2004

(30) Foreign Application Priority Data

Aug. 30, 2002 (JP) ............................. 2002-255729

(51) Int. Cl.
*G09G 5/00* (2006.01)
(52) U.S. Cl. ...................................... 455/557; 709/219
(58) Field of Classification Search ................. 345/473, 345/779; 382/260, 303; 455/550.1, 575.1, 455/557; 709/219
See application file for complete search history.

(56) References Cited

U.S. PATENT DOCUMENTS

| 5,905,492 A | 5/1999 | Straub et al. ................. 345/333 |
| 6,580,438 B1 | 6/2003 | Ichimura et al. |
| 2001/0056532 A1* | 12/2001 | Cooper ........................... 713/2 |

FOREIGN PATENT DOCUMENTS

| EP | 1143334 | 10/2001 |
| JP | 4-360228 | 12/1992 |
| JP | 6-266330 | 9/1994 |
| JP | 8-297585 | 11/1996 |
| JP | 8-305529 | 11/1996 |
| JP | 2000-163182 | 6/2000 |
| JP | 2000-207086 | 7/2000 |
| JP | 2001-142673 | 5/2001 |
| JP | 2001-228840 | 8/2001 |
| JP | 2002-108685 | 4/2002 |
| JP | 2002-236638 | 8/2002 |
| WO | WO 95/31775 | 11/1995 |
| WO | WO 01/20448 | 3/2001 |

OTHER PUBLICATIONS

European Patent Office Search Report dated Jul. 25, 2006, for corresponding European Patent Application No. 03255381.0.
JP 2001-228840 (Reference AF) corresponds to US 6,580,438 (Reference AA).
Office Action mailed on May 23, 2008 and issued in corresponding Japanese Patent Application No. 2002-255729.

* cited by examiner

*Primary Examiner*—Sam Bhattacharya
(74) *Attorney, Agent, or Firm*—Staas & Halsey LLP

(57) ABSTRACT

A mobile terminal includes a controller for switching a current screen theme of a GUI screen of an application program to a prospective screen theme, the GUI screen including two or more GUI tools of a same type, and a storage for storing a plurality of screen theme definition data sets, wherein the controller loads one of the plural screen theme definition data sets stored in the storage, which screen theme defines the prospective screen theme, into a memory region reserved for the application program, and draws the two or more GUI tools of a same type included in the GUI screen using the loaded screen theme definition data set, which is stored in the memory region for the application program. As a result, the entire GUI screen of an application is displayed on a common screen theme and a screen theme can be switched rapidly, using a reduced memory capacity.

16 Claims, 8 Drawing Sheets

MOBILE TERMINAL

BACKGROUND OF THE INVENTION

1. Field of the Invention

The present invention relates to a mobile terminal for performing various operations in accordance with user's instructions made via a GUI (Graphical User Interface) screen including GUI tools displayed by an application program (hereinafter sometimes called an application), and further relates to an application program for switching a GUI screen including GUI tools and a computer-readable recording medium in which the application program is stored.

2. Description of the Related Art

Recent personal computers, available on the market, have functions for displaying the entire GUI screen on a common theme (screen theme) and for successively switching screen themes (theme function).

Such a theme function is exemplified by a desktop theme of Windows (trademark) and a skin of RealAudio of Microsoft® Corporation.

Meanwhile, higher-performance mobile terminals, such as mobile telephones and PDAs (Personal Digital Assistants), are being developed recently and demand for installing functions (e.g., the theme function) identical to those installed in personal computers is arising.

However, in order to maintain portability, restricted size, weight, and other conditions do not allow a mobile terminal to have a high-performance CPU and a large-capacity memory.

For this reason, some development is required to mount the functions, identical to those of a personal computer, on mobile terminals with the above restrictions.

Especially to mount the above-mentioned theme function on a mobile terminal, it is important to be able to switch a screen theme at high speed and to reduce the size of a memory region dedicated to screen theme switching. High-speed switching requiring only a small memory region is also a necessity for personal computers.

SUMMARY OF THE INVENTION

With the foregoing problems in view, the first object of the present invention is to provide a mobile terminal for displaying a screen of an application on a common theme (screen theme) and switching a current screen theme to a prospective screen theme at a high speed. The second object of the present invention is to provide an application program for high-speed switching of a screen theme and a computer-readable recording medium in which the application program is stored.

The third object of the present invention is to perform switching (especially, high-speed switching) of a screen theme using a memory region having a capacity as small as possible.

To attain the first and third object of the present invention, as a first generic feature, there is provided a mobile terminal comprising: a controller for switching a current screen theme of a GUI (Graphical User Interface) screen of an application program to a prospective screen theme, the GUI screen including two or more GUI tools of a same type and being displayed on a display of the mobile terminal; and a storage for storing a plurality of screen theme definition data sets, one defining each of a plurality of screen themes; wherein the controller performs the steps of (a) loading one of the plural screen theme definition data sets stored in the storage, which screen theme definition data set defines the prospective screen theme, into a memory region reserved for the application program, and (b) drawing the two or more GUI tools of a same type included in the GUI screen using the loaded screen theme definition data set, which is stored in the memory region for the application program.

As a preferable feature, at the step (a) of loading, the controller may load at least part of the screen theme definition data set defining the prospective screen theme, which part concerns one or more GUI tools required for the GUI screen, from the storage into the memory region for the application program.

As another preferable feature, when the application program is activated, the controller may load a default screen definition data set defining a default screen theme, which data set is one of the plural screen theme definition data sets stored in the storage, into the memory region for the application program; and at the step (a) of loading, the controller may replace the default screen theme definition data set with the screen theme definition data set defining the prospective screen theme by loading the last-named screen theme definition data set stored in the storage into the memory region for the application program.

As an additional preferable feature, the controller may perform the step (a) of loading using screen-theme information managed by an operating system.

As a further preferable feature, the controller may load the plural screen theme definition data sets, which are stored in the storage, into a memory region reserved for an operating system, and at the step (a) of loading, the controller may load the screen theme definition data set defining the prospective screen theme loaded in the last-named memory region for the operating system, instead of loading the last-named screen theme definition data set stored in the storage.

As a still further preferable feature, if current screen theme information managed by an operating system is replaced, the controller may perform the step (a) of loading and the step (b) of drawing.

As a still further preferable feature, the controller may replace current screen-theme information managed by an operating system with screen-theme information associated with the prospective screen theme responsive to a screen theme determination command based on a screen-theme setting application program used for setting a screen theme; if the current screen-theme information is replaced with the screen-theme information associated with the prospective screen theme, the controller may send the first-named application program a notification of screen theme replacement based on the operating system; and if the first-named application program receives the notification of screen-theme replacement from the operating system, the controller may perform the step (a) of loading and the step (b) of drawing based on the first-named application program.

As a still further preferable feature, the controller may switch, in accordance with a position selected in a screen theme list included in a GUI screen of a screen-theme setting application program used for setting a screen theme, a screen theme of a GUI screen of the screen-theme setting application program.

As a still further preferable feature, the controller may display, in accordance with a position selected in a screen-theme list included in a GUI screen of a screen-theme setting application program used for setting a screen theme, a bitmap image on the display of the mobile terminal.

To attain the second and third object, as a second generic feature of the present invention, there is provided an application program for instructing a computer to switch a current screen theme of a GUI screen including two or more GUI tools of a same type to a prospective screen theme, wherein the application program instructs the computer to execute the following steps of: (a) loading one of a plurality of screen theme definition data sets stored in a storage, which screen theme defines the prospective screen theme, into a memory region reserved for the application program, and (b) drawing the two or more GUI tools of a same type included in the GUI screen using the loaded screen theme definition data set, which is stored in the memory region for the application program.

As a preferable feature, at the step (a) of loading, the application program may instruct the computer to load at least part of the screen theme definition data set defining the prospective screen theme, which part concerns one or more GUI tools required for the GUI screen, from the storage into the memory region for the application program.

As another preferable feature, when the application program is activated, the application program may instruct the computer to load a default screen definition data set which defines a default screen theme and which is stored in the storage, into the memory region for the application program; and at the step (a) of loading, the application program may instruct the computer to replace the default screen theme definition data set with the screen theme definition data set defining the prospective screen theme by loading the last-named screen theme definition data set stored in the storage into the memory region for the application program.

As an additional preferable feature, the application program may instruct the computer to perform the step (a) of loading using screen-theme information managed by an operating system.

As a further preferable feature, the application program may instruct the computer to load the screen theme definition data set defining the prospective screen theme, which screen theme definition data set is one from the plural screen theme definition data sets loaded from the storage into a memory region reserved for an operating system, instead of loading the screen theme definition data set defining the prospective screen theme from the storage.

As a still further preferable feature, if the application program receives a notification of screen theme replacement which notification is issued when current screen-theme information managed by an operating system is replaced, the application program may instruct the computer to perform the step (a) of loading and the step (b) of drawing.

To attain the second and third object, as a third generic feature of the present invention, there is provided a computer-readable storing medium in which application program, for instructing a computer to switch a current screen theme of a GUI (Graphical User Interface) screen including two or more GUI tools of a same type to a prospective screen theme, is stored wherein the application program instructs the computer to execute the following steps of: (a) loading one of a plurality of screen theme definition data sets stored in a storage, which screen theme defines the prospective screen theme, into a memory region reserved for the application program, and (b) drawing the two or more GUI tools of a same type included in the GUI screen using the loaded screen theme definition data set, which is stored in the memory region for the application program.

As a preferable feature, at the step (a) of loading, the application program may instruct the computer to load at least part of the screen theme definition data set defining the prospective screen theme, which part concerns one or more GUI tools required for the GUI screen, from the storage into the memory region for the application program.

As another preferable feature, when the application program is activated, the application program may instruct the computer to load a default screen definition data set which defines a default screen theme and which is stored in the storage, into the memory region for the application program; and at the step (a) of loading, the application program may instruct the computer to replace the default screen theme definition data set with the screen theme definition data set defining the prospective screen theme by loading the last-named screen theme definition data set stored in the storage into the memory region for the application program.

As an additional preferable feature, the application program may instruct the computer to perform the step (a) of loading using screen-theme information managed by an operating system.

As a further preferable feature, the application program may instruct the computer to load the screen theme definition data set defining the prospective screen theme, which screen theme definition data set is one from the plural screen theme definition data sets loaded from the storage into a memory region reserved for an operating system, instead of loading the screen theme definition data set defining the prospective screen theme from the storage.

As a still further preferable feature, if the application program receives a notification of screen theme replacement which notification is issued when current screen-theme information managed by an operating system is replaced, the application program may instruct the computer to perform the step (a) of loading and the step (b) of drawing.

To attain the second and third object, as a fourth generic feature of the present invention, there is provided a computer-implemented method of switching a current screen theme of a GUI (Graphical User Interface) screen of an application program to a prospective screen theme, which GUI screen includes two or more GUI tools of a same type, using a computer, comprising the steps of: (a) loading one of a plurality of screen theme definition data sets stored in a storage, which screen theme defines the prospective screen theme, into a memory region reserved for the application program, and (b) drawing the two or more GUI tools of a same type included in the GUI screen using the loaded screen theme definition data set, which is stored in the memory region for the application program.

Advantageously with a mobile terminal, an application program, a computer-readable recording medium in which an application program is stored of the present invention and/or a computer-implemented method of switching a current screen theme of a GUI (Graphical User Interface) screen, it is possible to display a screen of an application on a common theme (screen theme) and to switch a screen theme of a GUI screen at a high speed. Further, switching (especially, high-speed switching) of a screen theme of a GUI screen can be realized using a memory region as small in capacity as possible.

Other objects and further features of the present invention will be apparent from the following detailed description when read in conjunction with the accompanying drawings.

DESCRIPTION OF THE PREFERRED EMBODIMENTS

A preferred embodiment of a mobile terminal, an application program and a computer-readable recording medium in which the above application program is stored of the present invention will now be described with reference to the accompanying drawings.

In this preferred embodiment, a mobile terminal takes the form of a mobile telephone which is to be described with reference to FIGS. 1-10.

First of all, the configuration of the mobile telephone is described with reference to FIGS. 1-10.

Figure 1:
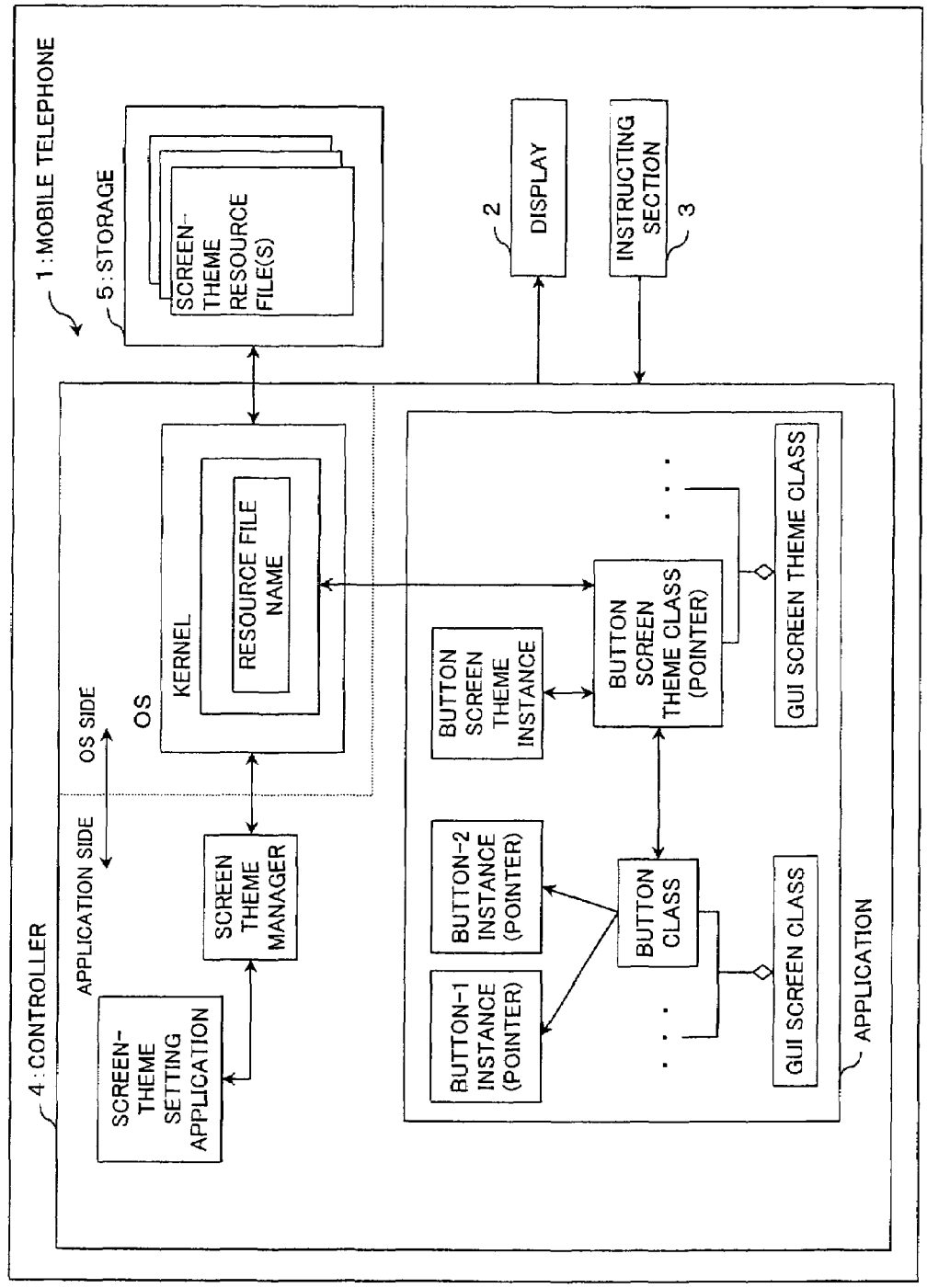
FIG. 1 is a block diagram schematically showing a mobile telephone according to an embodiment of the present invention.

As shown in FIG. 1, a mobile telephone 1 comprises display 2 serving as an outputting device (a displaying section), an instructing section (e.g., an operating button) 3 serving as an inputting device, a controller (computer) 4 made of by a CPU (Central Processing Unit) and a memory exemplified by a volatile memory of a RAM (Random Access Memory), a storage 5 in the form of a non-volatile memory (ROM; Read Only Memory), such as a flash memory, and the like. Further, the mobile telephone 1 includes elements (e.g., an antenna and a signal processing section) required for wireless communication, of course.

An operating system (hereinafter also called an OS) and various application programs (hereinafter also called applications) are installed in the storage 5. Desired functions of the mobile telephone 1 are realized by loading the OS and these applications into a memory on the controller 4 and subsequently executing the loaded OS and applications by the CPU.

Especially, this embodiment utilizes a multiprocessing OS with a multiprocessing function which is able to apparently execute a multiple of processes simultaneously by high-speed switching among the multiple processes in order to ensure system reliability and security.

In a monolithic OS that implements all the applications and the kernel (the fundamental function of an OS) in a single memory region, a problem (e.g., an error in memory access) in one of the applications halts the entire system.

On the other hand, a multiprocessing OS used in this embodiment serves as a function for memory protection restricting a memory region that each process can use so that the OS and programs (processes) such as applications use respective different memory regions. Therefore, an occurrence of a problem (e.g., an error in memory access) in a single program (process) has no influence on the OS and other applications.

Overhead reduction is important when a multiprocessing OS is used in the mobile telephone 1. Namely, overhead causes no serious problem in the use of a high-performance CPU, such as that of a personal computer. However, a mobile telephone cannot carry such a high-performance CPU for reasons of portability, so mobile telephones are compelled to use a low-performance CPU whereupon overhead reduction becomes an important issue.

Each application displays a GUI screen including one or more GUI tools. A user handles the instructing section 3 referring to a GUI screen displayed on display 2 and inputs various commands to the controller 4.

An object of this embodiment to provide a mobile telephone 1 which is able to use applications display GUI screens to display GUI screens of the applications installed in the mobile telephone 1 on a same desired theme (screen theme). As a result, with such a mobile telephone 1, a user can arbitrarily switch a GUI-screen theme to a desired one according to preference and/or temporary feeling of the user.

Specifically, a mobile telephone 1 which is able to use applications display GUI screens is configured to display the GUI screens on a common desired theme (screen theme) by standardizing color, solidity appearance, presence/absence of borders and/or other features of each of the GUI tools included in the individual GUI screens of the applications so that the GUI screens are in the theme of stylish decoration, mechanical functionality, stationery kinship or the like. The object of the mobile terminal of this embodiment is that, with such a function, a user can arbitrarily switch to a desired screen theme.

In order to realize switching of a screen theme of a GUI screen in the mobile telephone 1, it is important that the mobile telephone 1 should be configured to switch a screen theme of each application at a high speed when a current screen theme is switched to another.

Especially for the mobile telephone 1 including a multiprocessing OS with a memory-protecting function, it is important to reduce overhead by reducing memory accesses and context switches among processes as much as possible so that a screen theme of each application is switched at a high speed.

As a solution, the mobile telephone 1 of this embodiment has a system configuration with the following features (1) to (3).

(1) Screen theme definition data sets defining attributes (required for a GUI screen to be displayed on a common theme) of GUI tools (controls) of each type concerning a GUI-screen theme are stored to thereby create a number of screen-theme resource files, one associated with each screen theme in the illustrated example.

These screen theme resource files, one for each screen theme, are stored in the storage 5 (exemplified by a flash memory) and are managed by the file system of the OS.

Specifically, screen theme resource files, one for each screen theme, retain attribute data (such as background color, background bitmap, presence/absence of borders) of the GUI tools of all types that can be used in the mobile telephone 1 in a compressed form.

(2) However, if the screen theme definition data sets are stored in the screen theme resource files and managed by the file system of the OS likewise the above feature (1), the controller 4 has to refer to a screen theme resource file associated with a prospective screen theme the same number of times as the number of GUI tools included in a GUI screen to redraw a GUI screen when a current screen theme of each application is to be switched to the prospective screen theme.

Such storing and managing methods are not practical because context switches occur between an application and the kernel of the OS the same number of times as the number of GUI tools, thereby causing considerable overhead, which takes a long time to redraw the GUI tools (for example, the mobile telephone 1 turns into a sleep state). The same result is obtained even when a screen theme resource file associated with a prospective GUI-screen theme is loaded into a memory region reserved for the OS because context switches occur.

In order to realize high-speed switching of a screen theme of an application that displays a GUI screen including two or more GUI tools of a same type, the present embodiment is featured by the following points.

When a current screen theme is to be switched to another screen theme (a prospective screen theme), the controller 4, which is configured to perform operations to switch a screen theme of a GUI screen of an application, reads a screen definition data set defining the prospective GUI-screen theme from the screen theme resource file associated with the prospective screen theme, stores the read screen theme definition data set into a memory region reserved for the application and finally draws the GUI tools included in the GUI screen using the screen theme definition data set stored in the memory region for the application. As a result, it is possible to reduce overhead by reducing the number of context switches between the application and the kernel of the OS whereupon rapid screen theme switching is realized.

Further in this embodiment, the controller 4 loads only at least part (hereinafter also called GUI-tool screen theme definition data) of screen theme definition data set, which part concerns one or more GUI tools required for a GUI screen of an application into the memory reserved for the application. Since this reduces the capacity required to store GUI-tool screen theme definition data of the GUI screen, high-speed switching of a screen theme is realized in a mobile telephone with a small-capacity memory.

When an application is activated in the mobile telephone 1 of this embodiment, the controller 4 loads a default screen definition data set defining a default screen theme from a screen theme resource file associated with the default GUI screen into the memory region for the application program. After that, if the default screen is to be switched to a GUI screen of a prospective screen theme, the controller 4 replaces the default screen definition data set with the read screen definition data set of the prospective GUI screen theme so that a screen definition data set currently stored in the memory region for the application program is updated. As a result, screen theme switching can be accomplished in an even shorter time requiring a smaller-capacity memory region.

In the present embodiment, a screen theme definition data set is loaded from an associated screen theme resource file but a loading manner should by no means be limited to this. Alternatively, the controller 4 may previously load the screen theme definition data sets into a memory region reserved for the OS and then may read a screen theme definition data set that defines a prospective GUI screen theme from the memory region reserved for the OS, instead of reading from an associated screen theme resource file. In this case, for example, the screen theme definition data sets may be created using an excel sheet and the excel sheet may be loaded into the memory region for the OS upon activating the OS.

Hereinafter, the configuration of an application program that causes the controller (computer) 4 to perform screen theme switching will be now described with reference to FIG. 1. An application program of the illustrated example is created by object-orientation programming.

Here, a screen theme class is provided for each application. A screen theme class captures a screen theme definition data set and creates a screen theme instance. When the application program draws a GUI screen, an identical screen theme instance is used as a cache memory in order to draw two or more GUI tools of a same type.

As shown in FIG. 1, the application program includes a GUI screen class (an application screen class) as a class for drawing a GUI screen.

In this example, a GUI screen class is an aggregation of various GUI tool classes (e.g., a button class, a window class, an antenna/battery-level class) used to draw individual GUI tools that form a GUI screen. The GUI screen class is provided for each application and is an aggregation including only GUI tool classes required to draw GUI tools forming a GUI screen of the application.

Especially in the present embodiment, components of GUI tools of a same type are classified into components (peculiar components) peculiar to each of the GUI tools of a same type and components (common components) common to the GUI tools of a same type. A peculiar component of a GUI tool is regarded as an attribute of a GUI tool class. Peculiar components of a button class are exemplified by attributes representing the position, the size, and the letter string of each button.

Further, this embodiment sets a GUI screen theme class, in addition to a GUI screen class, to configure a screen theme of a GUI screen.

Here, a GUI screen theme class is an aggregation of various GUI-tool screen theme classes (e.g., a button screen theme class, a window screen theme class, an antenna/battery-level theme class) in order to configure a screen theme of each GUI tool. In the illustrated embodiment, a GUI screen theme class is an aggregation of GUI-tool screen theme classes of all of the GUI tools that can be used to form a GUI screen of an application.

Especially in the present embodiment, a common component of GUI tools of a same type can be a component to configure a screen theme so that a common component (a theme configuration component) is regarded as an attribute of a GUI-tool screen theme class. For example, a button screen theme class has attributes, such as the background color, the font face, and the presence/absence of a border of each button, as theme configuration components.

In this embodiment, when an application is activated, methods of a GUI screen class, each GUI tool class, a GUI screen theme class and each GUI-tool screen theme class are executed by the controller 4; as shown in FIG. 1, one or more GUI tool instances (such as button-1 instance and button-2 instance) are created from each GUI tool class (such as a button class), and a GUI-tool screen theme instance (such as a button screen theme instance) is created from each GUI tool screen theme class (such as a button screen theme class).

More specifically, the method of a GUI-tool screen theme class is executed by the controller 4 so that a screen theme definition data set is read from an associated screen theme resource file using the resource file name (current screen-theme information) of a current screen theme, which name is managed by the OS and a GUI-tool screen theme instance is created using the read screen theme definition data set. The controller 4 stores the created GUI-tool screen theme instance in a memory region reserved for the application program and notifies GUI tool class of an address (a pointer) of the memory region at which the created GUI-tool screen theme instance is stored.

For example, the controller 4 executes the method of the button screen theme class and a button screen theme instance is created, as shown in FIG. 1.

In particular, since the method of a GUI-tool screen theme class is executed by the controller 4 in response to a screen theme request message from the corresponding GUI tool class in this embodiment, only one or more GUI-tool screen theme instances required to configure a GUI screen of each application are created.

When an application is activated, the controller 4 uses a default screen theme resource file name of a default screen theme as the current screen theme resource file name.

Meanwhile, the controller 4 executes the method of a GUI tool class to create one or more GUI tool instances, stores the created instances into the memory region reserved for the application program and notifies the GUI tool class of the address (the pointer) of the memory region.

For example, if the controller 4 executes the method of the button class, button-1 instance and button-2 instance are created, as shown in FIG. 1. These created button instances notify the button class of an address (a pointer) of a memory region in which these instances are stored.

When each GUI tool that is an element of a GUI screen is to be drawn, the controller 4 executes the method of each GUI tool class associated with the GUI tool so that the controller 4 draws the GUI tool with reference to the corresponding GUI tool instance and GUI-tool screen theme instance using a pointer. Finally, individual GUI tools forming a GUI screen are drawn whereupon drawing of the GUI screen is completed.

For example, execution of the method of the button class by the controller 4 reads the button 1 instance and the button screen theme instance using the pointer so that the button 1 is drawn. Namely, the drawn button 1 is featured by both attributes (e.g., the position, the size and the letter string of button 1) retained by the button 1 instance and attributes (e.g., the background color, the font face and the presence/absence of borders of a button) retained by the button screen theme instance.

In the same manner, if the controller 4 executes the method of the button class, the controller 4 reads the button-2 instance and the button screen theme instance using the pointer so that the button 2 is drawn. Namely, the drawn button 2 is featured by both attributes (e.g., the position, the size and the letter string of button 2) retained by the button-2 instance and attributes (e.g., the background color, the font face and the presence/absence of borders of a button) retained by the button screen theme instance.

When a current screen theme is to be switched to a prospective screen theme, the controller 4 executes the methods of a GUI screen class, each GUI tool class, the GUI screen theme class and each GUI-tool screen theme class, and reads a screen theme definition data set defining the prospective screen theme using the resource file name of the prospective screen theme. The GUI-tool screen theme instances stored in the memory region reserved for the application are replaced (updated) using the read screen theme definition data set.

In other words, when a screen theme is to be switched in this embodiment, the controller 4 updates each GUI-tool screen theme instance by replacing attributes of the GUI-tool theme instance initialized by a constructor of the GUI-tool screen theme classes when the application is activated. In this example, each GUI-tool screen theme instance created when the application is activated is not deleted until the application terminates.

As described above, when a current screen theme is switched to another screen theme, the present embodiment does not create new GUI-tool screen theme instances nor initialize GUI-tool screen theme instances (e.g., using a "new" operator) whereupon high-speed switching of a screen theme can be realized. Further, since a memory capacity used during the time period from activation to the subsequent termination of the application remains same, it is possible to make a memory to be reserved for the application small in capacity. This enables a mobile telephone, which has only a small-capacity memory, to switch screen theme.

On the basis of an application program including a GUI screen theme class, the controller 4 loads a screen theme definition data set defining a prospective screen theme, to which a current screen theme is to be switched, from a screen theme resource file into a memory region reserved for the application program (the loading step). During the loading step, the controller 4 serves as a prospective screen theme loading means. Here, the loaded screen theme definition data set is stored in the memory region for the application, being regarded as attribute values of GUI-tool screen theme instances.

After replacement of each GUI-tool theme class instance, the controller 4 executes the method of a GUI screen theme class, sends the GUI screen class (specifically, each of the GUI-tool classes) a screen invalidation notification. In accordance with the notification, the controller 4 executes the method of the GUI screen class (specifically, each GUI-tool class) to redraw each GUI tool included in a GUI screen with reference to associated GUI-tool instance and GUI-tool screen theme instance. As a result, the GUI screen is redrawn.

In this case, the method of each GUI-tool class can also obtain a screen theme definition data set with reference to GUI-tool screen theme instances, but can also refer to the associated GUI tool instances, through a memory access within the process of the method of each GUI-tool class itself so that high-speed switching of a screen theme can be realized.

For example, during execution of the method of the button class by the controller 4, the controller 4 reads the button-1 instance and the button screen theme instance using a pointer and concurrently redraws the button 1. In the same manner, when the controller 4 executes the method of the button class, the controller 4 reads the button-2 instance and the button screen theme instance using a pointer and concurrently redraws the button 2.

(3) In the illustrated embodiment, the entire system manages a current screen theme, which is one from a number of screen themes, using a resource file name (screen theme information, such as a pointer) common to the entire system.

The detailed management manner is that: the name (hereinafter called the resource file name) of the resource file of a current screen theme is stored in the storage (exemplified by a flash memory) 5; and, when the mobile telephone 1 is powered on (when the OS is activated), the resource file name of the current screen is loaded into a memory region reserved for the OS (here, the resource file name is loaded, as a kernel object, into a memory region reserved for the kernel) whereby the screen theme resource file name of the current screen theme is managed by the OS. With this management method, it is possible to read, using a screen theme resource file name managed by the OS, a screen theme definition data set from an associated screen theme resource file.

The entire system retains a single resource file name of a current screen theme due to the following reason. If each of a number of memory regions, one allocated to each application program, retains the resource file name of a current screen theme, replacement of the resource file name has to be performed overall of the memory regions when the current screen theme is to be switched. That causes a large number of context switches among applications so that resultant occurrence of overhead causes a long delay in screen theme switching.

Conversely, if the entire system retains the resource file name of a current screen theme, screen theme switching requires only a one-time replacement of the resource file name so that the number of context switches among applications can be reduced. Therefore, resultant overhead can also be reduced whereupon high-speed switching of a screen theme is realized.

When a current theme is to be switched to a prospective screen theme, the resource file name of the current screen theme, which name is stored in the memory region of the OS (here, the kernel) is replaced in response to a screen-theme determination command from a user. Upon replacement of the current resource filename, the OS (here, the kernel) notifies a notification of screen theme replacement to each application (here, each GUI-tool screen theme class) in an active state at the moment of the replacement. Responsive to the notification, each application redraws one or more GUI tools of a GUI screen.

If the OS has a function for setting a pointer so as to issue an event to each application in an active state, for example, the OS sets a pointer so as to issue an event to each application (here, the GUI screen theme class) by using the above function. Under this condition, if a resource file name is replaced, the OS generates an event to be notified to each application (here, the GUI screen theme class) using the set pointer whereupon a notification of screen theme replacement issued to the application.

The storage (exemplified by a flash memory) 5 stores therein a default resource file name of a screen theme set as a default, which name is regarded as resource file name of a current screen theme. When the current screen theme is switched to a prospective screen theme and the resource file name on the memory region of the kernel is subsequently replaced, the default resource file name stored in the storage 5 is also replaced with a resource file name associated with the prospective screen theme. As a result, the default resource file name is preserved after the mobile terminal is powered off.

The mobile telephone 1 of this embodiment includes a screen-theme setting application (also called a screen setting application) used for setting a screen theme so that a user can arbitrarily set a screen theme of a GUI screen. The screen-theme setting application is configured the same as the above application and displays a GUI screen, the screen theme of which switches at high speed. The present embodiment further includes a screen theme manager in addition to the screen-theme setting application. Alternatively, all processes (functions) realized by the screen theme manager may be executed in the screen-theme setting manager.

The mobile telephone 1 of this embodiment has the above-described configuration. Processes in relation to screen theme switching performed by the controller 4 will now be described with reference to FIGS. 2-6.

Figure 2:
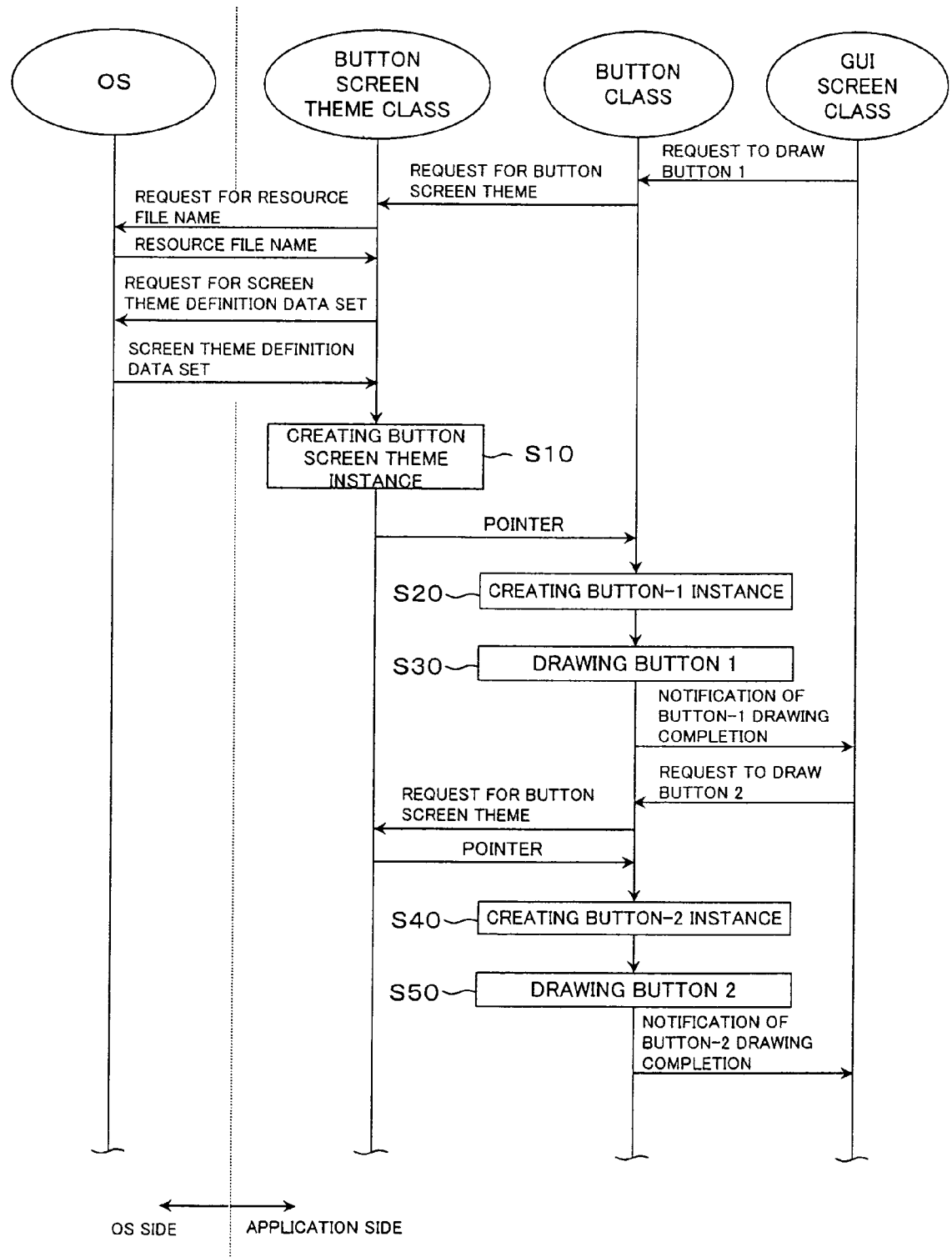
FIG. 2 is a flow diagram illustrating a succession of procedural steps of drawing a GUI screen when an application program is activated in the mobile terminal of FIG. 1.

(A) GUI-screen drawing process when activation of an application:

With reference to FIG. 2, description is made in relation to a process of drawing a GUI screen that the controller (computer) 4 performs by following the above application including the GUI screen class and the GUI screen theme class when the application is activated.

In the illustrated example, explanation is made focusing on drawing buttons (here two buttons: button 1 and button 2) as components of a GUI screen. However, other components, such as a list, of the GUI screen are drawn in the same manner described below.

As shown in FIG. 2, the GUI screen class of the application program issues a request to draw the button 1 that is a component of the GUI screen to the button class (issuing is performed by the constructor of the GUI screen).

The button class receives the request and issues a request for a button screen theme to the button screen theme class (the issuing is performed by the constructor of the button class). The constructor of the button class initializes one or more instances (objects) created by the button class.

Upon receipt of the request from the button class, the button screen theme class causes a constructor to create an instance (a button screen theme instance) of the button screen theme class. The constructor of the button screen theme class initializes the instance created by the button screen theme class.

First of all, the button screen theme class issues a request for a file name (hereinafter, a resource file name) of a screen theme resource file to the OS (here, the kernel).

In response to the request, the OS (here, the kernel) reads the resource file name of the current screen theme, which name is stored in the memory region (the OS memory region, the kernel memory region) reserved for the OS (here, the kernel) and notifies the read name to the button screen theme class.

The present embodiment includes a number of screen theme resource files. When the OS is activated (the mobile telephone 1 is powered on), the resource file name of a default screen theme set as a default is read among the screen theme resource file names and stored into the memory region reserved for the OS (here, the kernel).

Upon receipt of the resource file name, the button screen theme class issues a request for a part (hereinafter called button screen theme definition data) of a screen theme definition data set which part concerns the buttons. Here, the button screen theme class notifies the OS of the resource file name and the address at which the button screen theme definition data is stored to request the button screen theme definition data.

Responsive to the request, the OS reads a corresponding button screen theme definition data from an associated screen theme resource file, using the resource file name and the address at which the button screen theme definition data is stored, and notifies the button screen theme class of the read definition data.

In the illustrated embodiment, on the basis of the application program, the controller 4 reads a screen theme definition data set from an associated screen theme resource file using the resource file name of a current screen theme managed by the OS.

In succession, upon receipt of the button screen theme definition data, the button screen theme class creates a button screen theme instance (object) based on the received definition data, designates apart of a memory region (a memory region for the application) reserved for the application program as a button screen theme instance memory region, and stores the created button theme instance into the designated part of the memory region. The button screen theme class stores the address of the button screen theme instance memory region, in which the button screen theme instance is stored, that is, sets a pointer (hereinafter called a button screen theme pointer) (step S10).

As mentioned above, on the basis of the application including the button screen theme class (the GUI screen theme class), the controller 4 reads a default screen theme definition data set defining a screen theme, set as a default, from an associated screen theme resource file and stores the read data set into the memory region for the application (a step of loading a screen theme when an application is activated) when the application program is activated. At that time, the controller serves as a means for loading a screen theme when an application is activated.

Responsive to the request for a button screen theme from the button class, the button screen theme class notifies the button class of the button screen theme pointer.

The button class stores the button screen theme pointer received from the button screen theme class. After that, the button class creates an instance of the button 1 and designates a part of the memory region for the application program as a button-1 instance memory region, in which the created button-1 instance is stored. The button class stores the address of the button-1 instance memory region, in which the button-1 instance is stored, that is, sets a pointer (hereinafter called a button-1 pointer) (step S20).

After the button screen theme class creates the button screen theme instance and the button class creates the button-1 instance in the above manner, the button class draws the button 1 using these instances (step S30). Namely, the button class reads the button-1 instance using the button-1 pointer and further reads the button screen theme instance using the button screen theme pointer in order to draw the button 1.

When drawing of the button 1 is completed, the button class sends the GUI screen class a notification of button-1 drawing completion.

Subsequently, the GUI screen class issues a request to draw the button 2 that is another component of the GUI screen to the button class (the issuing is performed by the constructor of the application (GUI) screen class), as shown in FIG. 2. Upon receipt of the request, the button class issues a request for a button screen theme to the button screen theme class (the issuing is performed by the constructor of the button class).

Upon receipt of the message from the button class, the button screen theme class notifies the button class of the button screen theme pointer.

The button class stores the button screen theme pointer received from the button screen theme class. After that, the button class creates an instance of the button 2 and designates a part of the memory region for the application program as a button-2 instance memory region, in which the created button-2 instance is stored. The button class stores the address of the button-2 instance memory region, in which the button-2 instance is stored, that is, sets a pointer (hereinafter called a button 2 pointer) (step S40).

After the creation of the button-2 instance in the above manner, the button class draws the button 2 using the button-2 instance and the button screen theme instance. Namely, the button class reads the button-2 instance using the button 2 pointer and further reads the button screen theme instance using the button screen theme pointer in order to draw the button 2 (step S50).

When drawing of the button 2 is completed, the button class sends the GUI screen class a notification of button-2 drawing completion.

The process identical to that for drawing the button 2 is repeated in accordance with the number of other buttons in the GUI screen.

(B) Screen theme setting process based on a screen-theme setting application:

Description will now be made with reference to FIGS. 3 and 4 to explain processes for setting a screen theme performed by the controller (computer) 4 based on a screen-theme setting application (here, including a screen theme manger).

Figure 3:
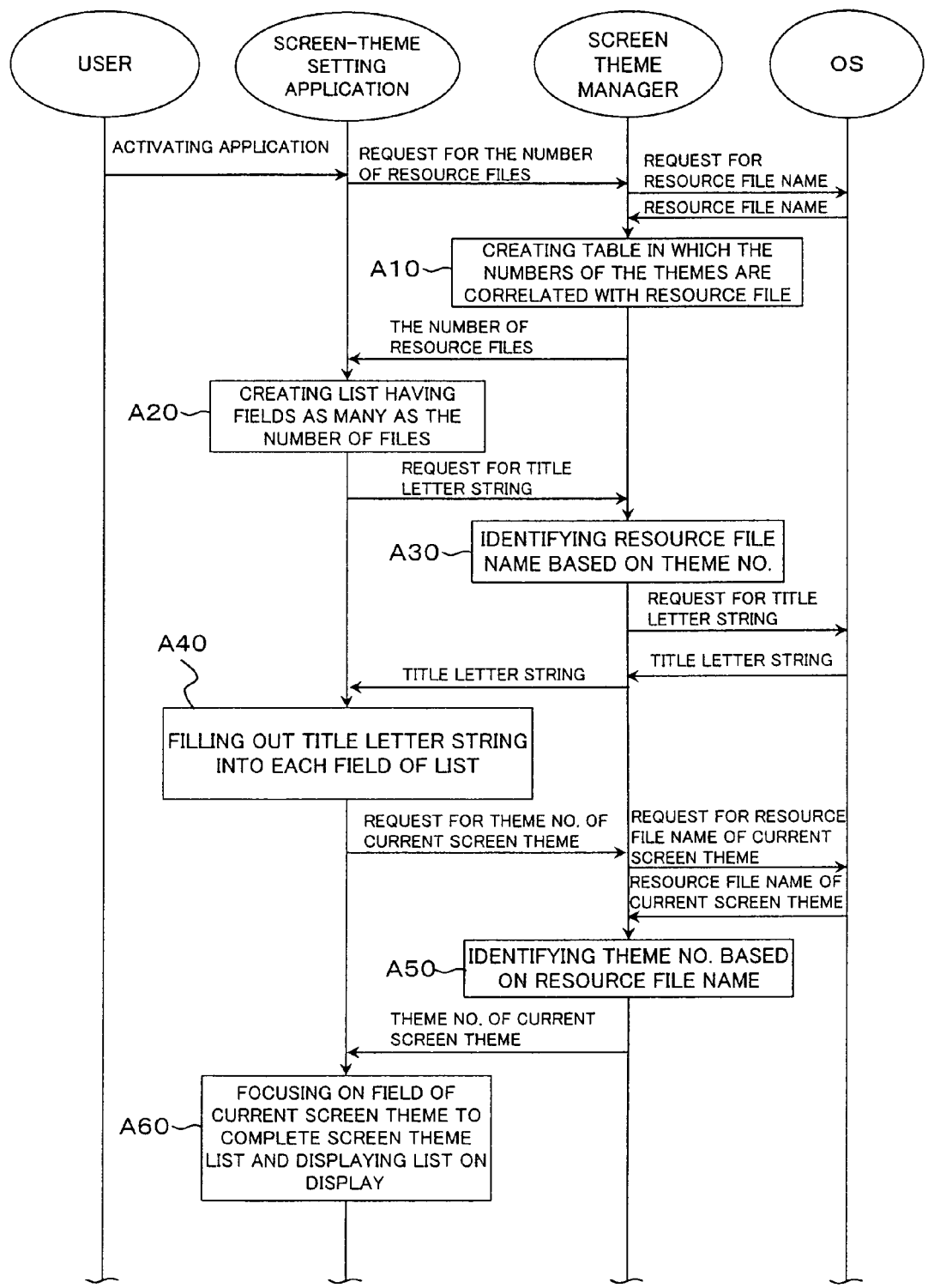
FIG. 3 is a flow diagram illustrating a succession of procedural steps of displaying a screen theme list when a screen theme is setting in the mobile telephone of FIG. 1.
Figure 4:
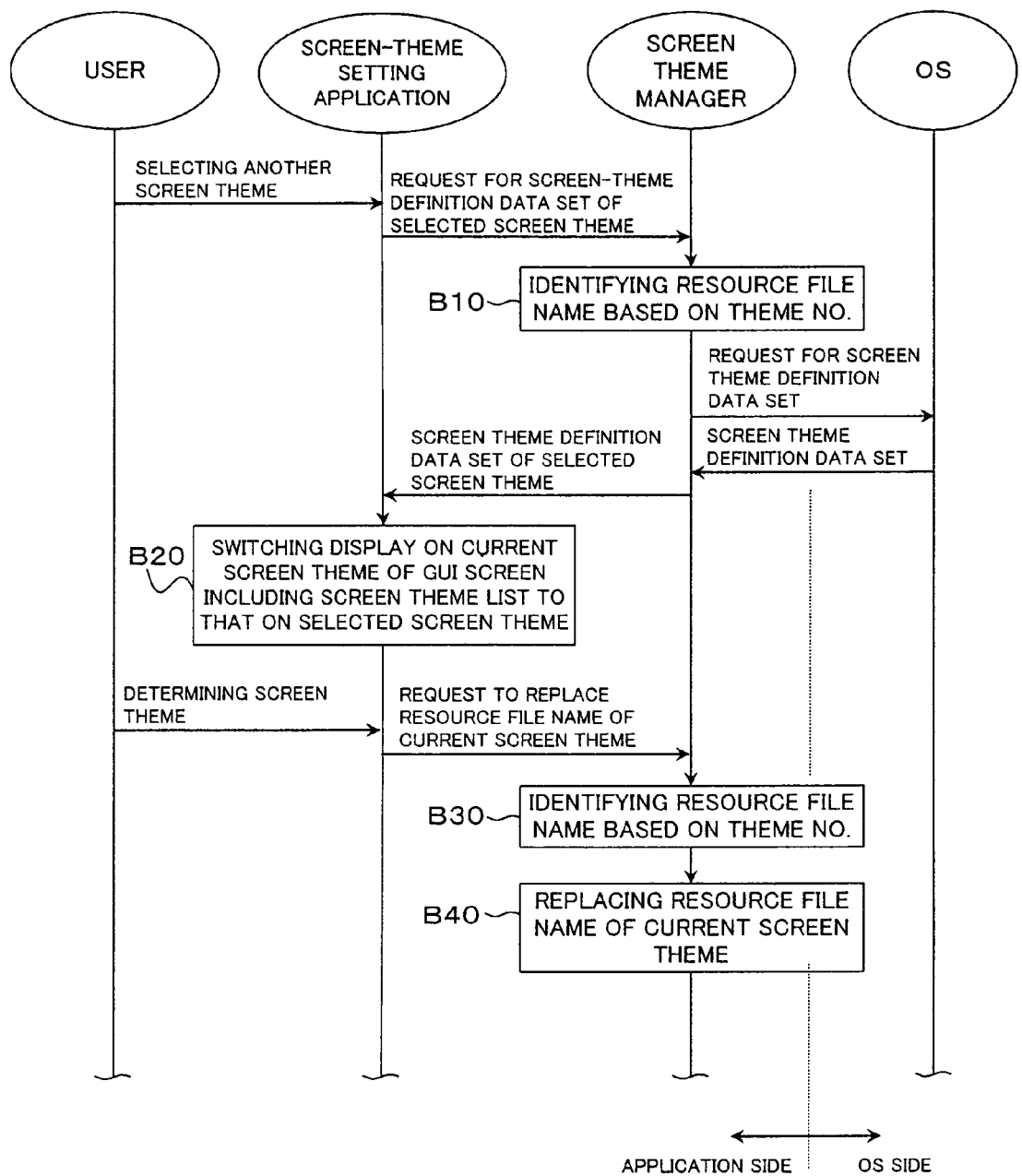
FIG. 4 is a flow diagram illustrating a succession of procedural steps of selecting and determining a screen theme when a screen theme is set in the mobile telephone of FIG. 1.

First, the following description with reference to FIG. 3 concerns a process for drawing a GUI screen of the screen-theme setting application (here, including the screen theme manager), which process is performed by the controller 4 based on the screen-theme setting application; and second, the following description with reference to FIG. 4, a process for setting a screen theme via a GUI screen of the screen-theme setting application, which process is performed by the controller 4 on the basis of the screen-theme setting application (here, including the screen theme manager).

The drawing of a GUI screen through the screen-theme setting application is basically identical to the process (see FIG. 2) for drawing a GUI screen through the above application.

As shown in FIG. 3, when a user activates the screen-theme setting application to set a screen theme, the controller 4 carries out the below list creation process to create a list having as many fields as the number of screen theme resource files by following the screen-theme setting application and the screen theme manager.

First of all, the screen-theme setting application issues a request for the number (hereinafter also called the resource file number) of screen theme resource files to the screen theme manager.

The screen theme manager issues a request for the file names (hereinafter called the resource file names) of all of the screen theme resource files to the OS. Upon receipt of the request, the OS obtains the file names of the entire screen theme resource stored in a directory for screen theme resource files in the file system and sends the screen theme manager all the resource file names.

Upon receipt the resource file names, the screen theme manager numbers each of the entire resource file names (the numbers of the resource file names are called theme Nos. (numbers)) and creates a correlation table in which each of the theme Nos. is associated with a resource file name (step A10). The screen theme manager further obtains the resource file number on the basis of the entire resource file names obtained from the OS and notifies the screen-theme setting application of the obtained number to respond to the request from the screen-theme setting application.

Upon receipt of the resource file number, the screen-theme setting application creates a list having as many fields as the resource file number (step A20). Each field of the list is associated with one of the theme Nos. of the correlation table in which each of the theme Nos. is associated with a resource file name, which table is managed by the screen theme manger.

Next, the controller 4 performs a process for filling out a title letter string into each field, created in the above manner, on the basis of the screen-theme setting application (including the screen theme manager) as follows.

As shown in FIG. 3, the screen-theme setting application issues a request for title letter strings, each representing one of the screen themes to be displayed in respective fields of the list, to the screen theme manager.

Responsive to the request, the screen theme manager identifies a resource file name (step A30) based on each of the theme Nos. associated with the fields that the issued request concerns. On the basis of the identified resource file names, the screen theme manager further issues, to the OS, a request for title letter string stored in the screen theme resource files.

Upon receipt of a response with the title letter strings from the OS, the screen theme manager notifies the screen-theme setting application of the received title letter strings to respond to the request for title letter strings to be displayed in the concerned fields.

Upon receipt of the response with the title letter strings of screen themes, the screen-theme setting application fills out the title letter string of each screen theme into the associated field of the list created in the above manner so that the title letter string putting process is completed (step A40).

Subsequently, in order that a user can distinguish the field representing the title letter string of the current screen theme from fields displaying title letter strings of other screen themes, the controller 4 focuses on (highlights) the field displaying the title letter string of the current screen theme by performing the below process by following the screen-theme setting application (here, including the screen theme manager).

First of all, the screen-theme setting application issues a request for the theme No. of the current screen theme to the screen theme manager.

Upon receipt of the request, the screen theme manager issues a request for the resource file name of the current screen theme to the OS (here, the kernel).

A response with the resource file name of the current screen theme from the OS (here, the kernel) causes the screen theme manager to identify the theme No. associated with the received resource file name of the current screen theme (step A50) using the correlation table in which each of the theme Nos. is associated with one of the resource file names. After that, the screen theme manager responds to the request from the screen-theme setting application with the identified theme No. as the theme No. of the current screen theme.

Upon receipt of the theme No. of the current screen theme from screen theme manager, the screen-theme setting application identifies the field associated with the received theme No. as a field displaying the title letter string of the current screen theme and then focuses on the field displaying the title letter string of the current screen theme so that a user can discriminate the field from other fields displaying title letter strings of other screen themes. This completes the screen theme list and the screen-theme setting application displays a GUI screen including the list on the display 2 (step A60).

Figure 7:
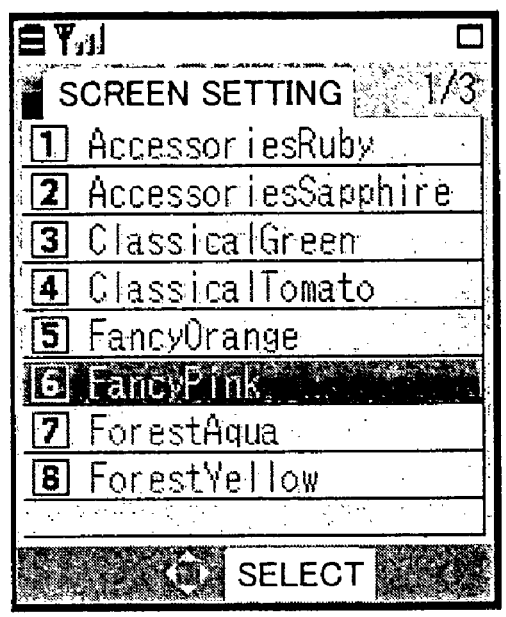
FIG. 7 is a diagram illustrating an example of a screen theme list displayed on the mobile telephone of FIG. 1.

Here, a GUI screen of the screen-theme setting application shown in FIG. 7, which screen is displayed on the display 2, includes a screen theme list having 8 fields, a select button, a scroll button, an antenna/battery-level button and so forth.

The individual 1st-8th fields in FIG. 7 represent the screen-theme title letter strings of "AccessoriesRuby", "Accessories-Sapphire", "ClassicalGreen", "ClassicalTomato", "FancyOrange", "FancyPink", "ForestAqua" and "ForestYellow" from the top.

Above all, the GUI screen of FIG. 7 is in the state of focusing on the 6th field with title letter string "FancyPink" for user discrimination of the current screen theme.

Since the current screen theme is set to "FancyPink" and the screen-theme setting application draws a GUI screen by performing the above drawing process (for example steps A20, A40 and A60) identical to those performed by the above application (see FIG. 2), the entire GUI screen of FIG. 7 is displayed on the common screen theme of "FancyPink".

Description will now be made with reference to FIG. 4 in relation to a process for setting a screen theme (a process for switching a current screen theme to another screen theme) which process is performed by the controller 4, on the basis of the screen-theme setting application (here, including the screen theme manager), through a GUI screen of the screen-theme setting application on the display 2.

First of all, when a user operates the instructing section 3 and selects a field displaying a title letter string representing another screen theme, the screen-theme setting application issues a request for the screen theme definition data set defining the selected screen theme to the screen theme manager.

Upon receipt of the request from the screen-theme setting application, the screen theme manager identifies the resource file name associated with the theme No. representing a field displaying the letter string of the selected screen theme (step B10) using the correlation table in which each of the theme Nos. that is associated with one of the resource file names. On the basis of the identified resource file name, the screen theme manager issues a request for the screen theme definition data set to the OS.

Upon receipt of a response with the screen theme definition data set from the OS, the screen theme manager notifies the screen-theme setting application of the received data set as the screen theme definition data sets defining the selected screen theme.

The screen-theme setting application receives the screen theme definition data set defining the selected screen theme and then switches a GUI screen including a screen theme list, which screen is in the current screen theme, to the GUI screen in the selected screen theme (step B20). Specifically, the screen-theme setting application carries out an identical process to a later-described process (see FIG. 6) for redrawing a GUI screen of a screen-theme setting application that is to be described later so that a current screen theme of the GUI screen is switched to another.

In the above manner, the controller 4 executes the process for switching a screen theme of a GUI screen in accordance with a position selected in the screen theme list based on the screen-theme setting application (here, including the screen theme manager).

After that, if the user depresses the select button on the GUI screen of FIG. 7 by operating the instructing section 3 to issue a screen-theme determination command for switching the current screen theme to another screen theme, the screen-theme setting application notifies the screen theme manager of a theme No. representing a field displaying the title letter string of the determined screen theme in order to request the screen theme manager to replace the resource file name of the current screen theme with that of the determined screen theme.

In response to the replacement request, the screen theme manager identifies the resource file name corresponding to the theme No. associated with the field displaying a title letter string of the determined screen theme (step B30) using the correlation table in which each of the theme Nos. is associated with one of the resource file names, and notifies the OS (here, the kernel) of the identified resource file name to request replacement of the resource file name representing the current screen theme.

Upon receipt of the request for replacement of the resource file name of the current screen theme from the screen theme manager, the OS (here, the kernel) replaces the resource file name of the current screen theme under management thereof with the identified resource file name (step B40).

Selection of a screen theme by the user causes a current screen theme of a GUI screen of the screen-theme setting application to switch to another screen theme. However, the present embodiment should by no means limited be to this. Alternatively, a bitmap image associated with each screen theme may be previously stored in a corresponding one of the screen theme resource files and the controller 4 may execute the following process on the basis of the screen-theme setting application (here, including the screen theme manager) so that a bitmap image is displayed on a GUI screen of the screen-theme setting application.

Figure 5:
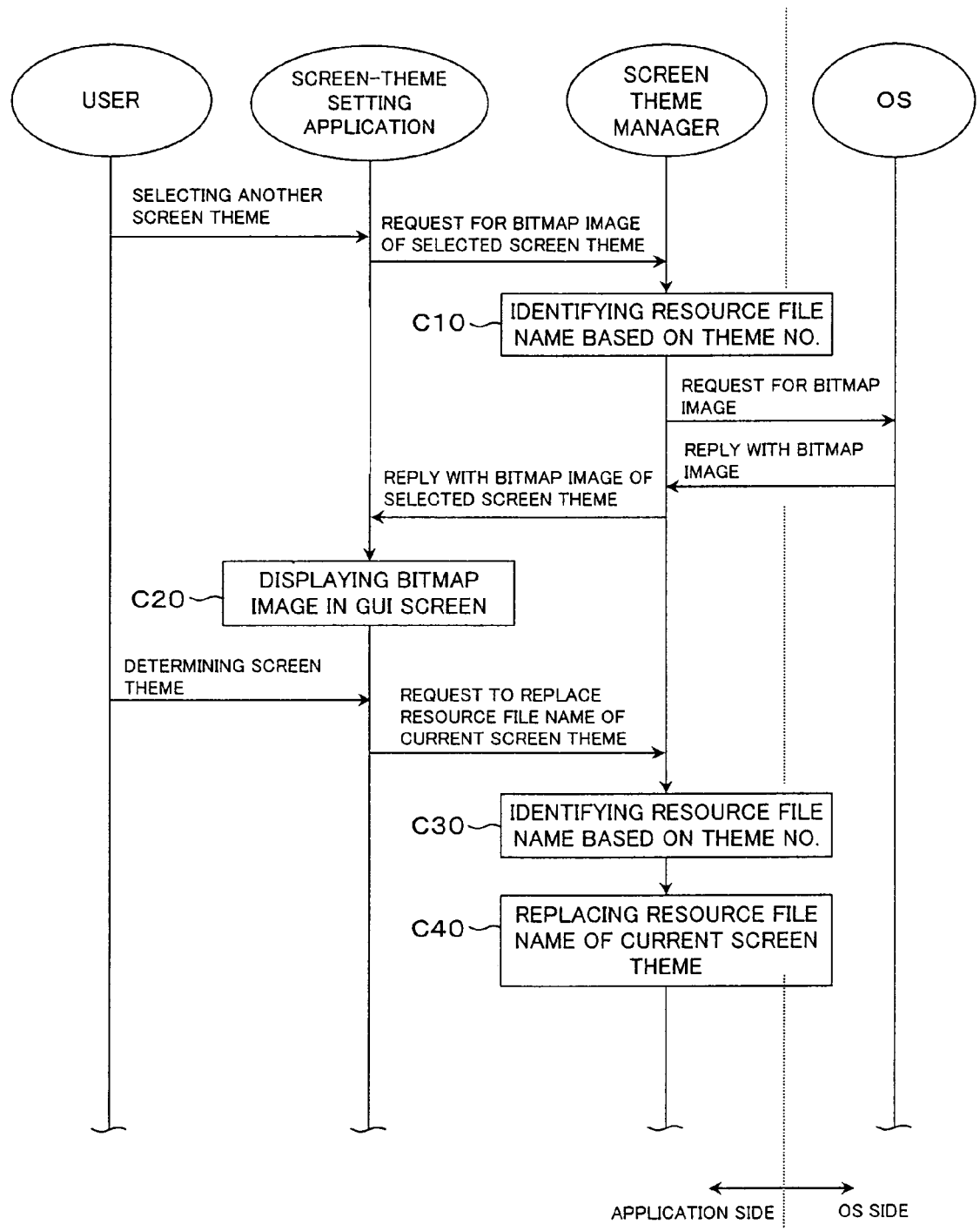
FIG. 5 is a flow diagram illustrating a succession of alternative procedural steps of selecting and determining a screen theme when a screen theme is set in the mobile telephone of FIG. 1.

In this alternative case as shown in FIG. 5, first of all when a user operates the instructing section 3 and selects a field displaying a title letter string of another screen theme, the screen-theme setting application issues a request for the bitmap image of the selected screen theme to the screen theme manager.

The screen theme manager receives the request from the screen-theme setting application and identifies the resource file name associated with theme No. corresponding to a field displaying the selected screen theme (step C10) using the correlation table in which each of the theme Nos. is associated with one of the resource file names. On the basis of the identified resource file name, the screen theme manager issues a request for the bitmap image to the OS.

Upon receipt of a response of the bitmap image from the OS, the screen theme manager sends the received bitmap image, as bitmap image of the selected screen theme, to the screen-theme setting application.

The screen-theme setting application receives the bitmap image of the selected screen theme and displays the received bitmap image on the GUI screen including a screen theme list (step C20).

In the above manner, the controller 4 executes the process for displaying a bitmap image on a GUI screen of the screen-theme setting application in accordance with a position selected in a screen theme list included in the GUI screen by following the screen-theme setting application and the screen theme manager.

After that, if the user depresses the select button on the GUI screen of FIG. 7 by operating the instructing section 3 to issue a screen-theme determination command for switching the current screen theme to another screen theme, the screen-theme setting application issues a request for replacement of the resource file name of the current screen theme to the screen theme manager.

In response to the replacement request, the screen theme manager identifies the resource file name corresponding to the theme No. associated with the field displaying a title letter string of the determined screen theme (step C30) using the correlation table in which each of the theme Nos. is associated with one of the resource file names, and notifies the OS (here, the kernel) of the identified resource file name to request replacement of the resource file name representing the current screen theme.

Upon receipt of the request for replacement of the resource file name of the current screen theme from the screen theme manager, the OS (here, the kernel) replaces the resource file name of the current screen theme under management thereof with the identified resource file name (step C40).

Figure 6:
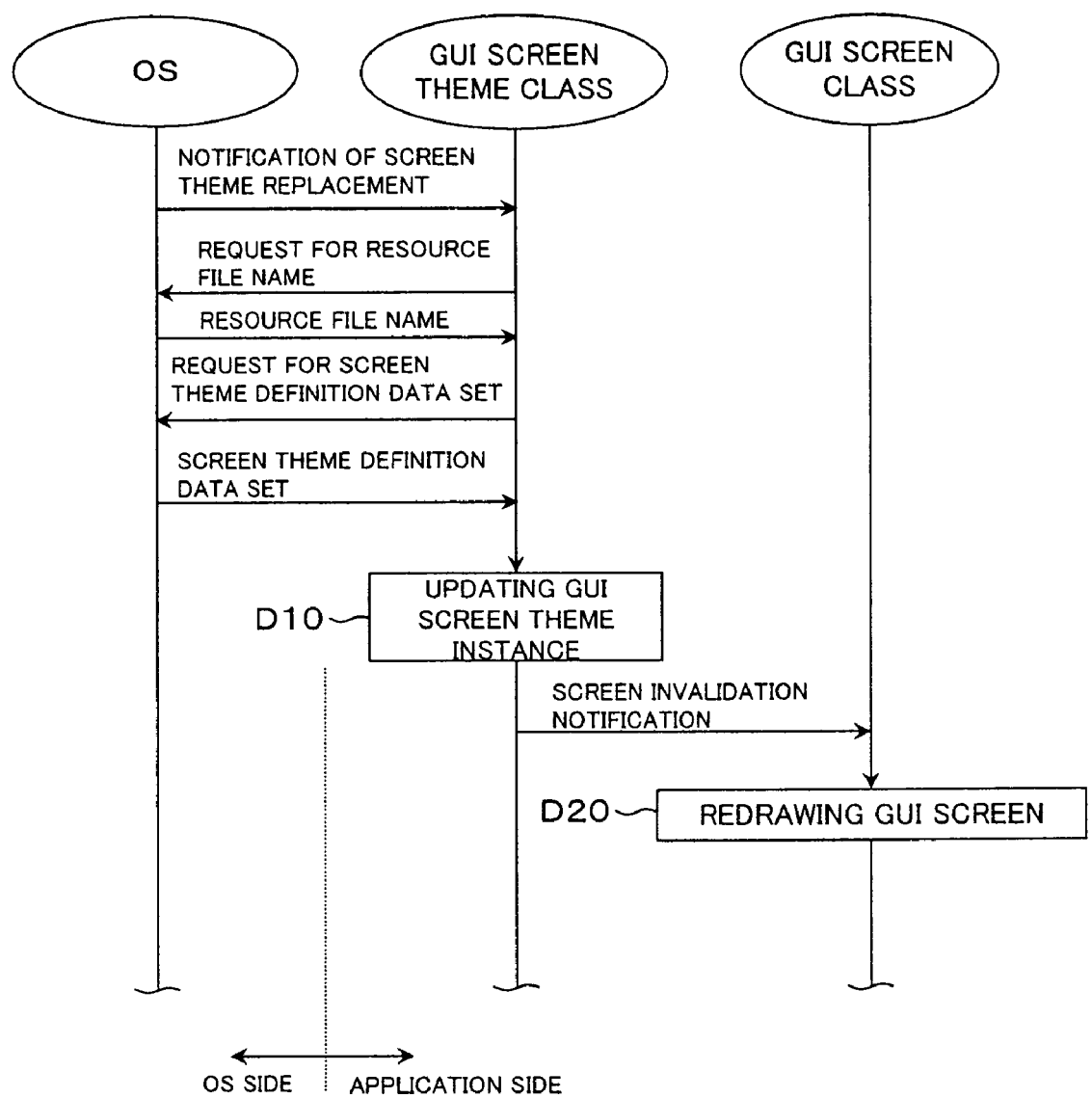
FIG. 6 is a flow diagram illustrating a succession of procedural steps of switching a screen theme of a GUI screen of an application in the mobile telephone of FIG. 1.

(C) GUI screen redrawing process when screen theme is switching:

Description with reference to FIG. 6 will be now made in relation to a redrawing process (a GUI screen switching process) of a screen theme of a GUI screen of an application including a GUI screen class and a GUI screen theme class performed by the controller 4 based on the application when another screen theme is set to be switched from a current screen theme.

Here, redrawing of buttons (here two buttons: button 1 and button 2) that are components of a GUI screen will be described. However, another component, such as a list, is redrawn in the same manner.

First of all, if the user determines to switch the current screen theme to another screen theme and the resource file name (current screen-theme information) of the current screen theme stored in the memory region of the OS (here, the kernel) is replaced with that of the determined screen theme in either one of the above manners, the OS (here, the kernel) notifies each application (here, the GUI screen theme class) in the active state at the time of the replacement of a resource file name of a notification of screen-theme replacement.

In the illustrated example, the OS is able to set a pointer so as to issue an event to each application in the active state. Using this function, the OS sets a pointer so as to issue an event to each application (here, the GUI screen theme class) so that screen-theme replacement is notified to the application (here, the GUI screen theme class) by the event issued from the OS using the pointer when the resource file name of the current screen theme is replaced.

Upon receipt of the notification (the event) of screen-theme replacement, the GUI screen theme class issues a request for the resource file name of the current screen theme to the OS (here, the kernel).

Specifically, since the GUI screen theme class is in the form of an aggregation of GUI-tool screen theme classes, such as a button screen theme class, each of the GUI-tool screen theme classes issues a request for the resource file name of the current screen theme to the OS (here, the kernel).

In response to the request, the OS (here, the kernel) reads the resource file name of the current screen theme from the OS (here, the kernel) memory region for the OS (here, the kernel) and notifies the GUI screen theme class (each GUI-tool screen theme class) of the read resource file name. At that time, the current resource file name is replaced with a resource file name of the screen theme (the prospective screen theme) to be displayed as a consequence of switching.

The GUI screen theme class (in detail, each GUI-tool screen theme class) receives the resource file name and then issues a request for a part (hereinafter also called GUI-tool screen theme definition data) of the screen theme definition data set corresponding to the resource file name which part concerns the associated GUI tool, such as a button, to the OS. Here, the GUI screen theme class (specifically, each GUI-tool screen theme class) notifies the OS of the resource file name and the address at which the associated GUI-tool (such as a button) screen theme definition data is stored to request the GUI-tool (such as a button) screen theme definition data.

In response to the request, the OS reads GUI-tool (such as a button) screen theme definition data concerning each GUI tool from an associated screen theme resource file using the resource file name and the address at which the GUI-tool (such as a button) screen theme definition data is stored and notifies the GUI screen theme class (specifically, the corresponding GUI-tool screen theme class) of the read GUI-tool screen theme definition data.

The GUI screen theme class (specifically, each GUI-tool screen theme class) receives each GUI-tool screen theme definition data (for example, concerning a button) and updates each GUI-tool screen theme instance (for example the button screen theme class) stored in the memory region for the associated GUI screen theme instance (for example, the memory region for the button screen theme instance) using the received definition data (step D10).

Namely, when the application is activated, each GUI-tool screen theme instance (for example, the button screen theme instance) is updated by resetting attributes of a GUI-tool screen theme instance (e.g., the button screen theme instance), which is initialized by the constructor of a GUI-tool screen theme instance (e.g., the button screen theme class) in advance, using the associated GUI-tool screen theme definition data.

In the above-mentioned manner, the controller 4 reads a screen theme definition data set of a screen theme to which a current screen theme is switched, from a screen theme resource file and stores the read data set into the memory region reserved for the application program including a GUI screen theme class (performing the step of loading a screen theme) on the basis of the application program. Here, a screen theme definition data set is regarded as attribute values of a GUI-tool screen theme instance when being stored in the memory region for the application.

In this case, the address of the memory region for a GUI-tool screen theme instance, at which a GUI-tool screen theme instance (for example, the button screen theme instance) after a screen theme is switched is stored, is identical to an address before the switching so that a pointer (for example, a button screen theme pointer) for each GUI-tool screen theme is not changed between before and after switching.

After the GUI screen theme class (specifically, the GUI-tool screen theme classes) updates all GUI-tool screen theme instances of the entire GUI tools forming a GUI screen, the GUI screen theme class issues a GUI screen invalidation notification (a screen invalidation notification) to the GUI screen class.

The GUI screen class receives the screen invalidation notification and each GUI-tool class included in the GUI screen class redraws the one or more associated GUI tools (step D20).

An example of a process for redrawing the buttons 1 and 2 will be described.

First of all, the GUI screen class issues a request to redraw the button 1 to the button class. Responsive to the request, the button class redraws the button 1 using the updated button screen theme instance and the button-1 instance. That is, the button class reads the button-1 instance using the button-1 instance pointer and further the button screen theme instance using the button screen theme instance pointer, and then redraws the button 1.

Subsequently, the GUI screen class issues a request to redraw the button 2 to the button class. In response to the request, the button class redraws the button 2 using the updated button screen theme instance and the button-2 instance. That is, the button class reads the button-2 instance using the button-2 instance pointer and further the button screen theme instance using the button screen theme instance pointer, and then redraws the button 2.

As mentioned above, the button class redraws the two buttons, button 1 and button 2, by using screen theme definition data set (button screen theme instances) stored in the memory region for the application, in preference to reading the same screen theme definition data set of the screen theme to which the current screen theme is switched from a screen theme resource file managed by the OS.

This means that, on the basis of the application including the GUI screen class, the controller 4 performs a step of GUI-screen drawing in which a number of GUI tools included in the GUI screen are drawn by using screen theme definition data set (GUI-tool screen theme instances) stored in the memory region for the application. At that time, the controller 4 serves to function as GUI screen drawing means.

The above manner reduces the number of context switches generated between the application and the OS to thereby reduce overhead so that rapid screen theme switching of each application can be realized.

Figure 8:
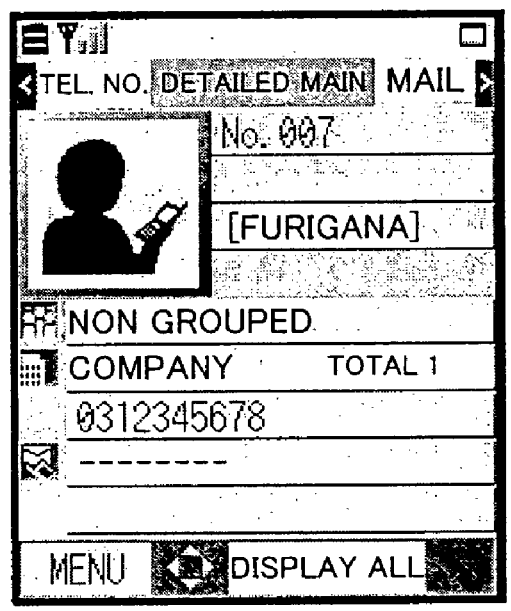
FIG. 8 is a diagram illustrating an example of a GUI screen of an application program, which screen is displayed on the mobile telephone of FIG. 1.
Figure 9:
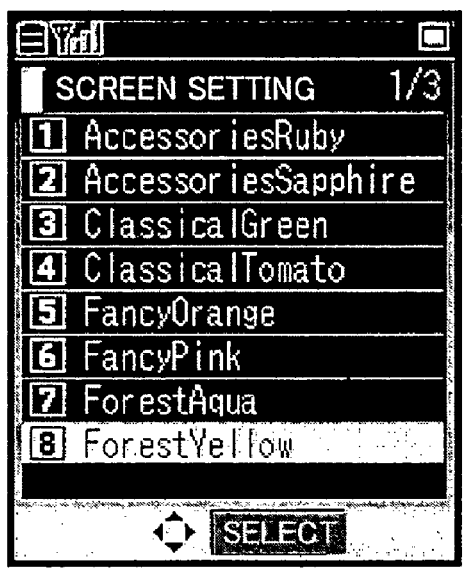
FIG. 9 is a diagram illustrating an example of changing a selected position in the screen theme list of FIG. 7.
Figure 10:
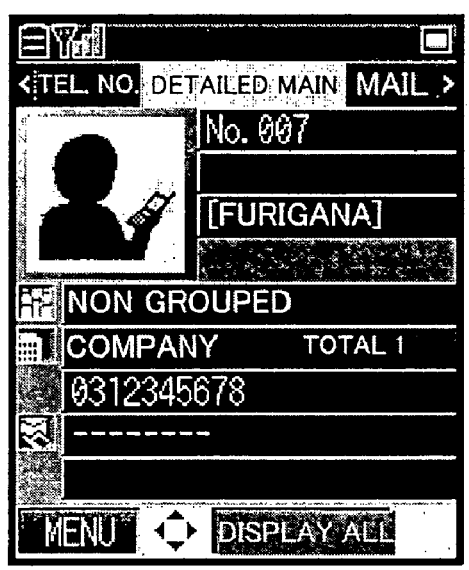
FIG. 10 is a diagram illustrating an example of switching a screen theme of a GUI screen of an application program which screen is displayed on the mobile telephone of FIG. 1.

When a current screen theme is set to be "FancyPink" (see FIG. 7), an example of a GUI screen of each application (the illustrated example represents the GUI screen of a telephone-directly application) is shown in FIG. 8. At that time, if the current screen theme "FancyPink" is switched to a prospective screen theme of "ForestYellow" using the screen-theme setting application in the above-described manner (FIG. 9), the GUI screen of each application (the illustrated example represents that of the telephone directly application) is switched to that displayed in FIG. 10 at a high speed.

A mobile telephone serving as a mobile terminal and an application program according to this embodiment of the present invention can display a whole screen of the application program on a unified theme (screen theme) and can advantageously function such that screen themes are switched one after another at high speed. Further advantageously, switching (especially, high-speed switching) of screen themes can be realized using as the smallest possible memory region.

In the illustrated example, a mobile telephone serves as a mobile terminal, which however should be by no means limited to this. As an alternative, a mobile terminal may be a PDA (Personal Data Assistant) or a portable terminal of another type. Further, the present invention is applied to a mobile telephone in this embodiment. Alternatively, the present invention may be applied to not only a mobile terminal such as a mobile telephone but also to a personal computer or the like having a function for screen theme switching.

In the illustrated embodiment, the mobile terminal has installed therein an application program (an application program for a mobile terminal) causing the controller 4 to execute screen theme switching. Such an application program can be recorded in a computer-readable recording medium so that the program stored in a recording medium is put onto the market for sales and purchases.

An application program stored in such a recording medium is installed into a mobile terminal exemplified by a mobile telephone or a computer exemplified by a personal computer and the telephone terminal or the personal computer executes the installed program whereby the advantageous results in this embodiment can be obtained.

Here, a recording medium is a storage which is able to store therein a program and is exemplified by a memory such as a semiconductor memory, a magnetic disc, an optical disc (e.g., a CD-ROM), an optic-magnetic disc (e.g., a MO), a magnetic tape, a hard disc, a flexible disc, an IC card, a ROM cartridge, a punched card, a storage (a RAM or a ROM) incorporated in a computer, and an external storage. As an alternative, a computer-readable recording medium may be a printed matter on which codes, such as barcodes, are printed. A CD-ROM, a MO, a magnetic tape, an IC card or the like are all examples of portable recording mediums.

Here, an application program is stored in a computer-readable recording medium but alternatively may not be stored in such a medium. Further alternatively, the application program may be transmitted (sent and received) through a network (a communication network) serving as a transmission medium, in preference to being stored in a storage of the above examples, whereupon it is possible to distribute and put the application program onto the market for sales and purchase. For example, the application program may be uploaded to a web server and may be downloaded from a web server through such a network such as the Internet.

Further, the present invention should by no means be limited to this foregoing embodiment, and various changes or modifications may be suggested without departing from the gist of the invention.

What is claimed is:

1. A mobile terminal comprising:
   a controller, to be instructed by a multi-processing operating system to execute a plurality of application programs in parallel using respective different memory regions, to switch a current screen theme of a GUI (graphical user interface) screen of an application program to a prospective screen theme, the GUI screen including two or more GUI tools of a same type and being displayed on a display of said mobile terminal; and a storage to store a plurality of screen theme definition data sets, one defining each of a plurality of screen themes;

wherein said controller is configured to (a) load one of the plural screen theme definition data sets stored in said storage, which screen theme definition data set defines the prospective screen theme, into a memory region reserved for the application program, and (b) draw the two or more GUI tools of a same type included in the GUI screen using the loaded screen theme definition data set, which is stored in the memory region for the application program.

2. A mobile terminal according to claim 1, wherein, at the step (a) of loading, said controller loads at least part of the screen theme definition data set defining the prospective screen theme, which part concerns one or more GUI tools required for the GUI screen, from said storage into the memory region for the application program.

3. A mobile terminal according to claim 1, wherein when the application program is activated, said controller loads a default screen definition data set defining a default screen theme, which data set is one of the plural screen theme definition data sets stored in said storage, into the memory region for the application program; and at the step (a) of loading, said controller replaces the default screen theme definition data set with the screen theme definition data set defining the prospective screen theme by loading the last-named screen theme definition data set stored in said storage into the memory region for the application program.

4. A mobile terminal according to claim 1, wherein said controller performs the step (a) of loading using screen-theme information managed by an operating system.

5. A mobile terminal according to claim 1, wherein said controller loads the plural screen theme definition data sets, which are stored in said storage, into a memory region reserved for an operating system, and at the step (a) of loading, said controller loads the screen theme definition data set defining the prospective screen theme loaded in the last-named memory region for the operating system, instead of loading the last-named screen theme definition data set stored in said storage.

6. A mobile terminal according to claim 1, wherein, if current screen theme information managed by an operating system is replaced, said controller performs the step (a) of loading and the step (b) of drawing.

7. A mobile terminal according to claim 1, wherein said controller replaces current screen-theme information managed by an operating system with screen-theme information associated with the prospective screen theme responsive to a screen theme determination command based on a screen-theme setting application program used for setting a screen theme;

if the current screen-theme information is replaced with the screen-theme information associated with the prospective screen theme, said controller sends the first-named application program a notification of screen theme replacement based on the operating system; and if the first-named application program receives the notification of screen-theme replacement from the operating system, said controller performs the step (a) of loading and the step (b) of drawing based on the first named application program.

8. A mobile terminal according to claim 1, wherein said controller switches in accordance with a position selected in a screen theme list included in a GUI screen of a screen-theme setting application program used for setting a screen theme, a screen theme of a GUI screen of the screen-theme setting application program.

9. A mobile terminal according to claim 1, wherein said controller displays, in accordance with a position selected in a screen-theme list included in a GUI screen of a screen-theme setting application program used for setting a screen theme, a bitmap image on the display of said mobile terminal.

10. A computer-readable recording medium in which an application program, for instructing a computer to switch a current screen theme of a GUI (Graphical User Interface) screen including two or more GUI tools of a same type to a prospective screen theme, is stored, said application program instructing the computer to execute the following processes:

(a) loading one of a plurality of screen theme definition data sets stored in a storage, which screen theme defines the prospective screen theme, into a memory region reserved for said application program, and (b) drawing the two or more GUI tools of a same type included in the GUI screen using the loaded screen theme definition data set, which is stored in the memory region for said application program;

wherein said computer is provided in a mobile terminal and is instructed by a multi-processing operating system to execute a plurality of application programs in parallel using respective different memory regions.

11. A computer-readable recording medium according to claim 10, wherein, at said step (a) of loading, said application program instructs the computer to load at least part of the screen theme definition data set defining the prospective screen theme, which part concerns one or more GUI tools required for the GUI screen, from the storage into the memory region for said application program.

12. A computer-readable recording medium according to claim 10, wherein when the application program is activated, said application program instructs the computer to load a default screen definition data set which defines a default screen theme and which is stored in the storage, into the memory region for said application program; and at the step (a) of loading, said application program instructs the computer to replace the default screen theme definition data set with the screen theme definition data set defining the prospective screen theme by loading the last-named the screen theme definition data set stored in the storage into the memory region for said application program.

13. A computer-readable recording medium according to claim 10, wherein said application program instructs the computer to perform the step (a) of loading using screen-theme information managed by an operating system.

14. A computer-readable recording medium according to claim 10, wherein said application program instructs the computer to load the screen theme definition data set defining the prospective screen theme, which screen theme definition data set is one from the plural screen theme definition data sets loaded from the storage into a memory region reserved for an operating system, instead of loading the screen theme definition data set defining the prospective screen theme from the storage.

15. A computer-readable recording medium according to claim 10, wherein, if said application program receives a notification of screen theme replacement which notification is issued when current screen-theme information managed by an operating system is replaced, said application program instructs the computer to perform said step (a) of loading and said step (b) of drawing.

16. A computer-implemented method of switching a current screen theme of a GUI (Graphical User Interface) screen of an application program to a prospective screen theme, which GUI screen includes two or more GUI tools of a same type, using a computer, comprising:

(a) loading one of a plurality of screen theme definition data sets stored in a storage, which screen theme defines the prospective screen theme, into a memory region reserved for the application program, and (b) drawing the two or more GUI tools of a same type included in the GUI screen using the loaded screen theme definition data set, which is stored in the memory region for the application program;

wherein said computer is provided in a mobile terminal and is instructed by a multi-processing operating system to execute a plurality of application programs in parallel using respective different memory regions.

* * * * *

UNITED STATES PATENT AND TRADEMARK OFFICE
CERTIFICATE OF CORRECTION

PATENT NO. : 7,660,604 B2
APPLICATION NO. : 10/647328
DATED : February 9, 2010
INVENTOR(S) : Ueda It is certified that error appears in the above-identified patent and that said Letters Patent is hereby corrected as shown below:

Column 22, Line 5, change "switches" to --switches,--.

Signed and Sealed this

Twenty-seventh Day of April, 2010

David J. Kappos
*Director of the United States Patent and Trademark Office*